United States Patent [19]

Kronberg

[11] Patent Number: 5,296,715
[45] Date of Patent: Mar. 22, 1994

[54] OPTICALLY ISOLATED SIGNAL COUPLER WITH LINEAR RESPONSE

[75] Inventor: James W. Kronberg, Aiken, S.C.

[73] Assignee: The United States of America as represented by the Department of Energy, Washington, D.C.

[21] Appl. No.: 993,553

[22] Filed: Dec. 21, 1992

[51] Int. Cl.[5] .............................................. H01J 40/14
[52] U.S. Cl. ...................................... 250/551; 307/311
[58] Field of Search ...................... 250/551, 227.11; 307/311

[56] References Cited

U.S. PATENT DOCUMENTS

| | | | |
|---|---|---|---|
| 3,996,475 | 12/1976 | Rodriguez | 250/551 |
| 4,138,635 | 2/1979 | Quinn | 307/311 |
| 4,237,382 | 12/1980 | Thillays | 250/551 |
| 4,386,285 | 5/1983 | Neathery et al. | 307/311 |
| 4,539,480 | 9/1985 | Artinano et al. | 250/551 |
| 4,546,262 | 10/1985 | Huggins | 250/551 |
| 4,549,085 | 10/1985 | Ulijasz | 250/551 |
| 4,565,924 | 1/1986 | Misumi et al. | 250/551 |
| 4,626,878 | 12/1986 | Kuwano et al. | 307/311 |
| 4,715,671 | 12/1987 | Miesak | 250/551 |
| 4,730,114 | 3/1988 | Portmann | 250/551 |
| 5,047,090 | 9/1991 | Hayashi et al. | 250/551 |
| 5,103,084 | 4/1992 | Williams et al. | 250/551 |
| 5,216,303 | 6/1993 | Lu | 307/311 |

FOREIGN PATENT DOCUMENTS 0052543  4/1977  Japan .................................. 250/551

OTHER PUBLICATIONS

French, "LED-LDR Isolator," Radio & Electronics Constructor, pp. 532'534, Apr. 1975.
Hamamatsu Product Catalogs, "Photocouplers", pp. 1-17, 1990.
Hamamatsu Product Catalog, "Cds Photoconductive Cells", 1990-1991, pp. 7-15.

*Primary Examiner*—Michael Messinger
*Attorney, Agent, or Firm*—Brian R. Tumm; Harold M. Dixon; William R. Moser

[57] ABSTRACT

An optocoupler for isolating electrical signals that translates an electrical input signal linearly to an electrical output signal. The optocoupler comprises a light emitter, a light receiver, and a light transmitting medium. The light emitter, preferably a blue, silicon carbide LED, is of the type that provides linear, electro-optical conversion of electrical signals within a narrow wavelength range. Correspondingly, the light receiver, which converts light signals to electrical signals and is preferably a cadmium sulfide photoconductor, is linearly responsive to light signals within substantially the same wavelength range as the blue LED.

18 Claims, 2 Drawing Sheets

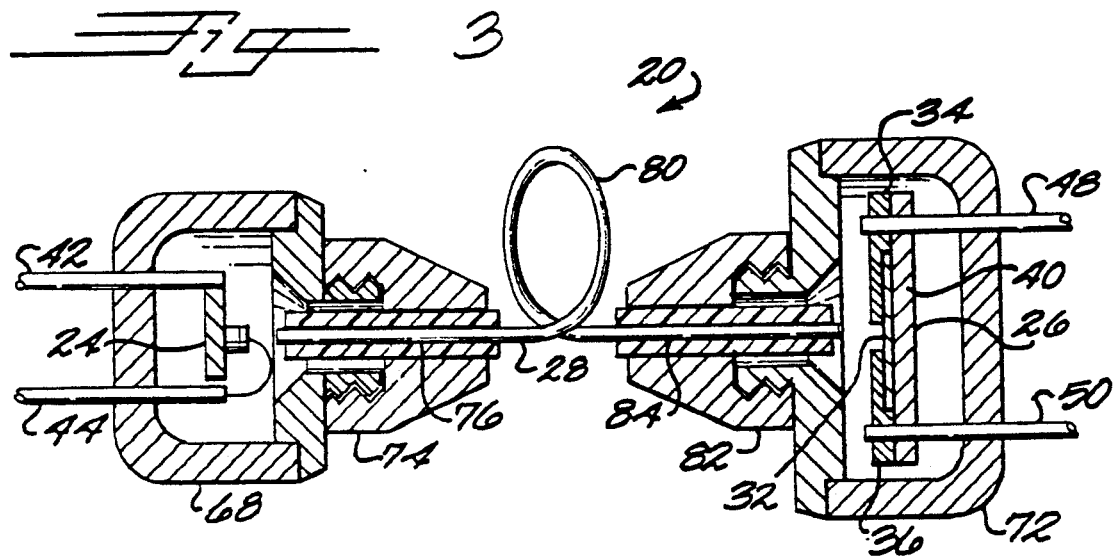
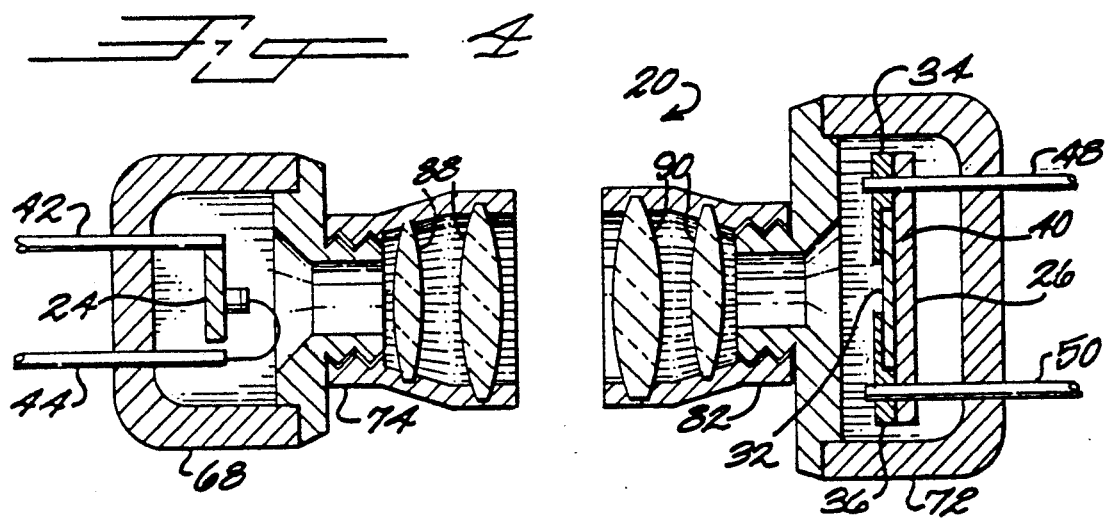

OPTICALLY ISOLATED SIGNAL COUPLER WITH LINEAR RESPONSE

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to devices for isolating one part of an electrical circuit from another. More particularly, the present invention relates to optocouplers for converting electrical signals into corresponding light signals and then back into electrical signals, thereby providing electrical isolation between two parts of an electrical circuit.

2. Discussion of Background

Electro-optical conversion devices are known and used for many purposes, including photoelectric conversion, light detection, optical data processing, and electrical isolation.

For example, with respect to photoelectric conversion, Hayashi et al, in U.S. Pat. No. 5,047,090, disclose a semiconductor device having a plurality of photoelectric conversion elements made of amorphous silicon for generating electric power.

Misumi et al, in U.S. Pat. No. 4,565,924, teach electro-optical conversion in an optical feedback, light signal binary device, that can be used as a light level detector or light relay in optical fiber transmission. The device converts input light signals to electrical signals, using a phototransistor or photodiode, and then converts the electrical signals back to optical output signals, using a ordinary LED.

Optical data processing systems, such as disclosed by Ulijasz in U.S. Pat. No. 4,549,085, can also use electro-optical conversion. In his data processing system, Ulijasz uses LEDs and photodiodes in emitter-detector pairs that are capable of processing both short and long wavelength optical signals.

In U.S. Pat. No. 4,539,480, Artinano et al describe an electrical isolation device for interrelated electrical circuitry. The device uses a pair of optically interconnected emitter-receiver systems disposed in input and output loop circuits. Also, the system output is related to the input current.

Optocouplers, often referred to as optical isolators, are well known electro-optical devices for translating or converting electrical signals into light signals, and subsequently back into electrical signals. Optocouplers are used to permit translation of data between electronic systems that may exist at differing ground potentials, at separated locations, or both.

An optocoupler essentially consists of three elements: a light emitter, a transmission medium, and a light detector. The emitter may be any device capable of converting electrical energy into light at virtually any wavelength or band of wavelengths. Similarly, the detector may be any device capable of detecting and responding to the emitted wavelengths and converting them to electrical signals or modulating externally-supplied current in a corresponding manner. The transmission medium must be an electrically-insulating material that is transparent to light at the wavelengths used. The separation between emitter and detector can range from a few millimeters, such as in a packaged optical isolator, to several miles, such as in a fiberoptic arrangement.

There are two known types of detectors used in optocouplers, each having different electrical characteristics. The first type is a photoconductor, or photoconductive cell, employing the use of a photosensitive material, such as cadmium sulfide, cadmium selenide, or a combination thereof.

The second type of detector is photodiode, which is essentially a photosensitive semiconductor. The photodiode absorbs photons and produces an electric current proportional to the number of photons.

The differing electrical characteristics make these detecting devices suitable for different applications. Photodiodes have a faster response, typically within nanoseconds, than do photoconductors. Also, photodiodes can produce power for use by other devices, while photoconductors cannot. However, photoconductors are more rugged, easier and less expensive to manufacture, and have higher voltage and power ratings. Additionally, a photoconductor appears electrically as a pure resistance with conductivity linearly proportional to the incident light intensity, and thus can be extremely versatile in control and signal processing applications, particularly where analog signals are involved.

However, conventional optocouplers, using these detectors and conventional light emitters, have limited application due to problems inherent in the combination of these components, such as wavelength mismatch and thermal-noise effects.

There is a need for an improved optocoupler having improved conversion characteristics, in particular, truly linear signal conversion.

SUMMARY OF THE INVENTION

According to its major aspects and broadly stated, the present invention is an optical device for isolating electrical signals. In particular, it is an optocoupler, or optical isolator, that converts electrical data to optical signals, and then back to electrical signals in such a way that the converted signals are proportional to the initial signals. The optocoupler comprises a light emitter, a light receiver, and a light transmitting medium. The light emitter converts electrical signals to light but only within a specific, narrow range of wavelengths. Correspondingly, the light receiver, which converts light signals to electrical signals, is of the type that is linearly responsive to light signals within the same narrow wavelength range. Thus, the optocoupler provides electrical isolation with true, linear correspondence between electrical input and output signals.

A major feature of the present invention is the combination of a blue silicon carbide LED and a cadmium sulfide photoconductive cell. Because of this particular combination, the output current of the present invention will be proportional to the input current. The advantage of this feature is that optical isolation can be used in many more circuits to prevent electrical interference but with reliable signal transmission.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a cross-sectional view of an optocoupler according to an alternative embodiment of the present invention; and FIG. 4 is a cross-sectional view of an optocoupler according to an alternative embodiment of the present invention.

DETAILED DESCRIPTION OF A PREFERRED EMBODIMENT

Figure 1:
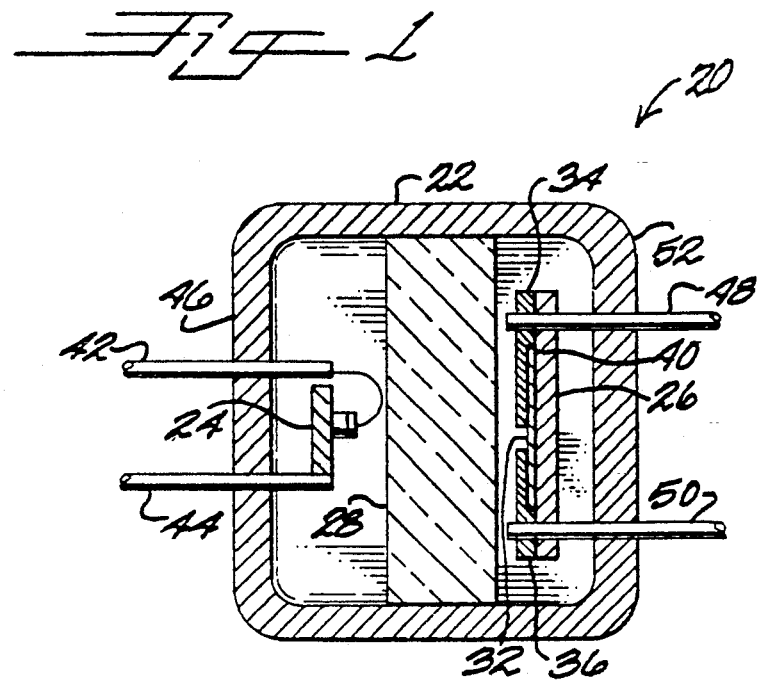
FIG. 1 is a cross-sectional view of an optocoupler according to a preferred embodiment of the present invention.

In the following description similar components are referred to by the same reference numeral in order to simplify the understanding of the sequential aspect of the drawings.

Referring now to FIG. 1, the optocoupler 20 in its preferred embodiment is a compact housing 22 that encapsulates or otherwise carries a light emitter 24, a light receiver 26, and a light transmitting medium 28. Light transmitting medium 28 is preferably a transmission medium, such as glass or plastic, that provides sufficient electrical isolation and physical separation.

Light receiver 26 is preferably comprised of a light receiving material 32 mounted between a pair of conductive pads 34, 36 and an insulating plate 40. Conductive pads 34, 36 are in electrical communication with light receiving material 32 and positioned so that light receiving material is also in optical communication with light transmitting medium 28. By optical communication it is meant that light can pass unblocked from light transmitting medium 28 to light receiving material 32 with or without reflection or refraction.

Light emitter 24 is mounted within housing 22 in close proximity to light transmitting medium 28 so that virtually all light signals emitted by light emitter 24 enter light transmitting medium 28. Similarly, light receiver 26 is mounted within housing 22 in close proximity to light transmitting medium 28 so that light receiving material 32 is optically coupled to, that is, receives substantially all light coming from, light transmitting medium 28.

A first pair of conductive wires 42, 44, in electrical communication with light emitter 24, extends outward through a first side 46 of housing 22 to electrically connect with an external, electrical input system (not shown). A second pair of conductive wires 48, 50, in electrical communication with light receiver material 32 through conductive contact pads 34, 36, extends outward through a second side 52 of housing 22 to electrically connect with an external, electrical input system (not shown).

Housing 22 surrounds light emitter 24, light receiver 26, and light transmitting medium 28 to prevent the entry of ambient light. Housing 22 may be cast or molded around these parts, or, alternatively, housing 22 may be a moldable material in which light emitter 24 and light receiver 26 are emplaced. Light transmitting medium 28 can also be emplaced within housing 22 and a liquid, such as a transparent liquid epoxy resin, poured into housing 22, filling the cavity between light emitter 24 and light receiver 26. The liquid is then cured to form a solid device.

Alternatively, light transmitting medium 28 can be a transparent or translucent, heat-resisting material, such as PYROCERAM®, and both light emitter 24 and light receiver 26 can be deposited directly on opposite sides of light transmitting medium 28. That is, light emitter 24 may be mounted to one side of light transmitting medium 28 by soldering it to metallic traces deposited thereon. Similarly, a cadmium sulfide light receiver 26 may be formed by depositing conductive pads 34, 36 directly on the opposite side of light transmitting medium 28 and depositing cadmium sulfide on pads 34, 36.

Light emitter 24 can be any device capable of converting electrical signals into light signals linearly, but is preferably a light emitting diode (LED). Linear or proportional to means that the output is equal to the input multiplied by a constant. Conventional LEDs are made from semiconductor material, usually consisting of gallium and aluminum combined with phosphorous, arsenic, or antimony. LEDs of this type are well known and are readily available at low cost.

However, light emitter 24 is preferably an LED made of silicon carbide, which emits blue light, the intensity of which emitted light is proportional to the current flowing through the LED.

Light receiving material 32 is preferably a photoconductive cell made of cadmium sulfide. Photoconductive cells of this kind respond linearly to input electrical signals, and thus are more advantageous for use in devices such as optocoupler 20, than are other light receiving devices, such as photodiodes, and the like.

A photoconductive cell behaves like a resistor whose value is controlled by incident light. Current flowing through a photoconductive cell is proportional both to the applied voltage (regardless of polarity) and the intensity of the incident light. Thus, at a constant voltage, the cell's resistivity is linearly responsive to the intensity of incident light received.

Light receiving material 32 is preferably made of cadmium sulfide, since cadmium sulfide has by far the highest detectivity of any practical photoconductive material. Detectivity is the ratio of a material's light sensitivity at a given wavelength to its vulnerability to thermal noise. This high detectivity results from the large band gap of cadmium sulfide (2.42 volts) compared with other materials commonly used. However, as a side effect, cadmium sulfide is only sensitive to wavelengths shorter than 540 nanometers (green).

Figure 2:
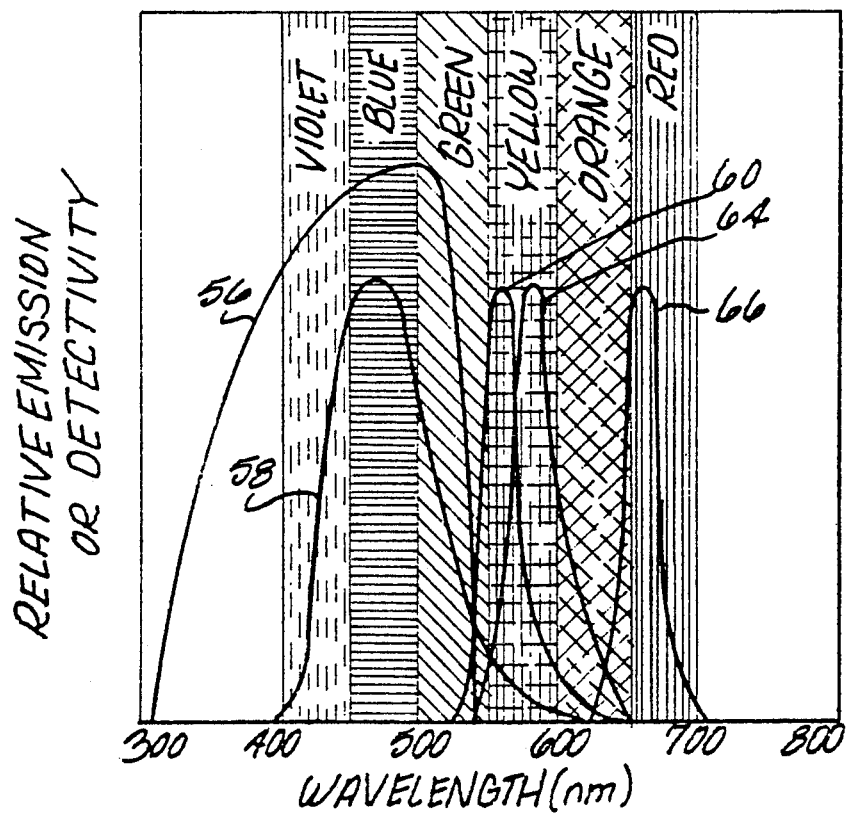
FIG. 2 is a graphical view of the light emission levels of several LEDs, and the detection level of the light receiver of the present invention.

Referring now to FIG. 2, in general, the relative emissions of blue, green, yellow, and red LEDs across a wavelength range of from 300 nanometers to 800 nanometers is shown. Also shown is a plot 56 of the relative detectivity, or sensitivity range, of cadmium sulfide, such as for a photoconductive cell made of cadmium sulfide.

As can be seen, cadmium sulfide sensitivity range 56 is such that it responds to light only of blue-green or shorter wavelength. Specifically, cadmium sulfide responds to light having a wavelength within the range of from 320 nanometers to 540 nanometers, with a maximum response to light having a wavelength approximately 510 nanometers.

A blue LED emission plot 58 shows that its light emission falls substantially within the wavelength range of cadmium sulfide sensitivity. Specifically, blue LED emission plot 58 occurs between 415 nanometers and 565 nanometers, with the maximum emission intensity having a wavelength of approximately 470 nanometers.

Similarly, a green LED emission plot 60 shows an emission range from 540 nanometers to 600 nanometers, with the maximum intensity having a wavelength of approximately 565 nanometers. A yellow LED plot 64 shows an emission range from 558 nanometers to 628 nanometers, with the maximum intensity having a wavelength of approximately 585 nanometers. Also, a red LED plot 66 shows an emission range from 632 nanometers to 682 nanometers, with the maximum intensity having a wavelength of approximately 660 nanometers.

As shown graphically in FIG. 2, or numerically by the above data, yellow LED emission plot 64 and red LED emission plot 66 fall completely outside of cadmium sulfide sensitivity range 56. Thus, conventional red and yellow LEDs are unable to induce photoconductivity in a photoconductive cell made of cadmium sulfide.

A small percentage of green LED emission plot 60 is within cadmium sulfide sensitivity range 56, thus optocoupler 22 can be made using a green LED as light emitter 24 and cadmium sulfide as light receiving material 32 in light receiver 26. However, the linearity of optocoupler 20 with such a configuration is very poor due to the substantially mismatched bandwidths, and to changes in the emitted bandwidth due to changes in driving current, voltage and temperature.

However, emission plot 58 of a blue LED, namely an LED made of silicon carbide, falls almost entirely within cadmium sulfide sensitivity range 56, thus LEDs made of silicon carbide are capable of inducing virtually linear photoconductivity in cadmium sulfide. Also, small changes in emitted bandwidth have negligible effects on this linearity. Therefore, optocoupler 20 using a silicon carbide LED as light emitter 24 and a cadmium sulfide photoconductive cell as light receiver 26 provides optimum linearity between the input and output signals of optocoupler 20.

In FIG. 3, an alternative embodiment of optocoupler 20 is shown. Light emitter 24 is encapsulated by an emitter housing 68 so that light emitter 24 is optically coupled with light transmitting medium 28, here taking the form of an optical fiber 80. Similarly, light receiver 26 is encapsulated by a receiver housing 72 so that light receiving material 32 is optically coupled to light transmitting medium 28.

A first connector 74 aligns a first end 76 of optical fiber 80 with light emitter 24 so that the two are optically coupled. Similarly, a second connector 82 aligns a second end 84 of optical fiber 80 with light receiver 26 so that second end 84 is optically coupled with light receiving material 32. Optical fiber 80 can be a rod, fiber, or any other shape of glass, plastic, or any other material transparent in the range between 415 nanometers and 540 nanometers.

In FIG. 4, a second alternative embodiment of optocoupler 20 is shown. Instead of light transmitting medium 28 being optical fiber 80 connected to emitter housing 68 through first connector 74 and receiver housing 72 through second connector 82, light transmitting medium 28 consists of a first system of lenses 88 and a second system of lenses 90, together with the free space therebetween. Lens systems 88, 90 are positioned so that light from light emitter 24 may be collimated, transmitted through free space, and collected by light receiver 26.

In use, optocoupler 20 is positioned "between" electrical input and output systems (not shown) needing electrical isolation. Conductive wires 42, 44 are electrically connected to the electrical input system, and conductive wires 48, 50 are electrically connected to the electrical output system. The input system is then operated so that electrical signals are transmitted to optocoupler 20.

Light emitter 24, preferably a blue LED made of silicon carbide, emits light signals, substantially within the blue wavelength band, having intensity proportional to the magnitude of the current passing through light emitter 24. Thus, the input electrical signals are linearly converted to light signals. The light signals are transmitted by light transmitting medium 28 to light receiver 26.

Light receiving material 32, preferably made of cadmium sulfide, linearly converts the light signals back to electrical signals by changing resistivity in proportion to the intensity of the received light signals, thereby altering the current flowing across light receiver 26. The output electrical signals, linearly converted from the light signals and proportional to the electrical signals input to optocoupler 20, are transmitted to the electrical output system via conductive wires 48, 50.

The linear response provided by optocoupler 20 in isolating electrical systems makes optocoupler 20 suitable for many possible uses, including use in amplifier gain circuitry, signal dividing or ratioing circuitry, exponential growth and decay circuitry, and in voltage-controlled, variable frequency oscillator circuitry, among others.

It will be apparent to those skilled in the art that many changes and substitutions can be made to the preferred embodiment herein described without departing from the spirit and scope of the present invention as defined by the appended claims.

What is claimed is:

1. Apparatus for optically isolating electric signals, said apparatus for use with an electrical input system and an electrical output system, said apparatus comprising:
    a light emitting diode made of silicon carbide, said light emitting diode responsive to electric input signals from said input system and converting said electric input signals to light signals; and
    means in spaced relationship to said light emitting diode for receiving light, said light receiving means responsive to said light signals and converting said light signals to electrical output signals, said electric output signals proportional to said electric input signals, said light receiving means in electrical communication with said output system.

2. The apparatus as recited in claim 1, wherein said light emitting diode emits light within a first wavelength range and having an intensity proportional to said input signal.

3. The apparatus as recited in claim 1, wherein said light receiving means receives light having an intensity and within a first wavelength range, said light receiving means converting said light received to electrical output signals proportional to said light intensity.

4. The apparatus as recited in claim 1, wherein said light emitting diode emits light within a wavelength range of between 415 and 565 nanometers with an intensity having a maximum at a wavelength approximately 470 nanometers.

5. The apparatus as recited in claim 1, wherein said light receiving means is linearly responsive to light having a wavelength of no more than 513 nanometers.

6. The apparatus as recited in claim 1, wherein said light emitting diode is a blue light emitting diode, said diode emitting light having a wavelength within the range from approximately 415 nanometers to approximately 565 nanometers.

7. The apparatus as recited in claim 1, wherein said light receiving means further comprises a photoconductive cell.

8. The apparatus as recited in claim 1, wherein said light receiving means is made of cadmium sulfide.

9. The apparatus as recited in claim 1, further comprising diode for transmitting light between said light emitting means and said light receiving means, said light transmitting means in optical communication with said light emitting means and said light receiving diode and positioned therebetween.

10. The apparatus as recited in claim 1, further comprising means for transmitting light, said light transmitting means made of a heat-resistant material and having a first side and an opposing second side, said first side having said light emitting diode deposited thereon, said second side having said light detecting means deposited thereon.

11. The apparatus as recited in claim 1, further comprising diode for holding said light emitting means, said light transmitting means and said light receiving means in fixed space relation, said holding means having a first side in electrical communication with said input system and an opposing second side in electrical communication with said output system.

12. The apparatus as recited in claim 1, further comprising a transparent fiber for transmitting light, said light transmitting fiber having a first end in optical communication with said light emitting diode and a second end in optical communication with said light receiving means.

13. The apparatus as recited in claim 1, further comprising a means for transmitting light, said light transmitting means having a first system of lenses and a second system of lenses, said first system of lenses positioned so that said light signals from said light emitting diode passes therethrough, said second system of lenses positioned so that said light signals passing through said first system of lenses passes through said second system of lenses to said light receiving means.

14. An optocoupler for isolating electrical signals between an electrical input system and an electrical output system, said apparatus comprising:
a blue light emitting diode made of silicon carbide, said light emitting diode responsive to input signals from said input system and converting said input signals to light signals having an intensity and a wavelength within the range from approximately 415 nanometers to approximately 565 nanometers;
a photoconductive cell in spaced relationship to said light emitting diode, said photoconductive cell made of cadmium sulfide and linearly responsive to said intensity of said light signals having a wavelength of no more than approximately 513 nanometers and converting said light signals to electrical output signals, said electric output signals proportional to said electric input signals, said photoconductive cell in electrical communication with said output system; and
means for transmitting light between said light emitting diode and said photoconductive cell, said light transmitting means in optical communication with said light emitting diode and said photoconductive cell and positioned therebetween.

15. The apparatus as recited in claim 14, wherein said light emitting diode emits light within a first wavelength range and said photoconductive all receives light within said first wavelength range, said light intensity proportional to said electrical input signals, said electrical output signals proportional to said light intensity.

16. The apparatus as recited in claim 14, wherein said blue light emitting diode emits light within a wavelength range of between 415 and 565 nanometers with said light intensity having a maximum at a wavelength approximately 470 nanometers.

17. The apparatus as recited in claim 14, wherein said photoconductive cell is responsive to light having a wavelength of no more than approximately 513 nanometers.

18. The apparatus as recited in claim 14, further comprising means for holding said light emitting diode, said light transmitting means and said photoconductive cell in fixed space relation, said holding means having a first side in electrical communication with said electrical input system and an opposing second side in electrical communication with said electrical output system.

* * * * *